United States Patent [19]
Kieke

[11] Patent Number: 5,911,276
[45] Date of Patent: Jun. 15, 1999

[54] USE OF UNMODIFIED KRAFT LIGNIN, AN AMINE AND A WATER-SOLUBLE SULFONATE COMPOSITION IN ENHANCED OIL RECOVERY

[75] Inventor: Dan Edward Kieke, Sealy, Tex.

[73] Assignee: Texaco Inc, White Plains, N.Y.

[21] Appl. No.: 08/864,010

[22] Filed: May 27, 1997

[51] Int. Cl.⁶ ..................................................... E21B 43/22
[52] U.S. Cl. ........................ 166/270.1; 166/400; 166/275; 507/206; 507/248; 507/250; 507/259; 507/936
[58] Field of Search ............................... 166/270.1, 400, 166/275, 305.1; 507/106, 108, 206, 207, 248, 250, 259, 936

[56] References Cited

U.S. PATENT DOCUMENTS

| | | |
|---|---|---|
| 3,956,142 | 5/1976 | Wilson et al. . |
| 4,450,011 | 5/1984 | Schilling et al. . |
| 4,548,721 | 10/1985 | DeBons et al. . |
| 4,611,659 | 9/1986 | DeBons et al. ...................... 166/270.1 |
| 4,739,040 | 4/1988 | Naae et al. . |
| 4,739,041 | 4/1988 | Morrow et al. . |
| 4,743,633 | 5/1988 | Navratil et al. . |
| 4,756,370 | 7/1988 | DeBons . |
| 4,781,251 | 11/1988 | Naae et al. . |
| 4,787,454 | 11/1988 | Naae et al. . |
| 4,790,382 | 12/1988 | Morrow et al. . |
| 4,821,803 | 4/1989 | Debons . |
| 4,822,501 | 4/1989 | Debons et al. . |
| 4,836,285 | 6/1989 | Navratil et al. . |
| 5,035,288 | 7/1991 | Kieke et al. ......................... 166/270.1 |
| 5,094,295 | 3/1992 | Morrow . |
| 5,094,296 | 3/1992 | DaGue .................................... 166/275 |
| 5,114,599 | 5/1992 | Debons et al. . |
| 5,230,814 | 7/1993 | Naae et al. . |

*Primary Examiner*—George Suchfield
*Attorney, Agent, or Firm*—Henry H. Gibson; A. M. (Andy) Arismendi, Jr.

[57] ABSTRACT

A method for the enhanced recovery of oil comprises injecting into an oil-containing formation an aqueous surfactant system having at least (1) a blend containing an unmodified Kraft lignin, an oil-soluble amine and a water-soluble sulfonate, and (2) water; driving the surfactant system through the formation and producing the oil mobilized by the surfactant system. A surfactant composition useful for enhanced oil recovery methods is also provided having at least an unmodified Kraft lignin, an oil-soluble amine and a water-soluble sulfonate.

22 Claims, No Drawings

USE OF UNMODIFIED KRAFT LIGNIN, AN AMINE AND A WATER-SOLUBLE SULFONATE COMPOSITION IN ENHANCED OIL RECOVERY

FIELD OF THE INVENTION

The present invention is directed to methods of enhanced oil recovery and to compositions useful therein.

BACKGROUND

Petroleum is produced from subterranean formations through wells penetrating the formation. Initially, natural reservoir pressure may be sufficient to cause the oil to flow to the surface. As natural reservoir pressure declines due to production from the reservoir, various forms of artificial lift may be employed to bring to the surface the oil which flows into the well bores. This phase of production is usually termed "primary".

Typically, during the primary production period of a reservoir, only 10–30% of the oil initially in place may be economically recovered. As the production rate from a reservoir falls near the level at which it is no longer economic to operate the field, active steps, usually termed "secondary", are taken to increase recovery. In some instances, secondary recovery techniques may be employed from the time of initial production from a reservoir to optimize recovery.

The most common form of secondary recovery is the process known as waterflooding. In a waterflood project, water is injected into the oil-producing formation through injection wells, repressurizing the formation and sweeping oil which would not have otherwise been produced into production wells. Such a procedure will usually allow the economic production of an additional 10–30% of the oil originally in place.

As is readily seen, a reservoir may have as much as 80% by volume of the original oil in place still unproduced after primary and secondary operations have terminated. The increasing scarcity of crude oil has led to the development of various techniques intended to allow further production from reservoirs which have been depleted by primary and secondary operations. These operations aimed at enhanced oil recovery (EOR) from conventionally depleted reservoirs are generally termed "tertiary".

Among the most promising of tertiary recovery methods are processes wherein a solution of surfactants is injected into the reservoir. The surfactant mobilizes the oil remaining in place after conventional production and allows it to be swept into production wells.

Many types of surfactants have been investigated and the choice of which surfactants to employ in a chemical enhanced oil recovery operation is dependent upon reservoir characteristics as well as the cost and availability of the surfactants. One problem with many surfactants is their high cost of manufacture. Accordingly, surfactants which are relatively cheap have an inherent advantage in the market place.

Lignin is a waste by-product that the pulping industry produces in prodigious amounts. As a result, a large research effort has been undertaken over the last forty (40) years in attempts to find uses for the large volume of lignin by-product.

Lignin itself is a major noncarbohydrate constituent of wood and woody plants. It functions as a natural plastic binder for the cellulose fibers and permeates the membranes of the cells and the spaces between cells of the wood, thereby strengthening them. Although many investigators have attempted to define lignin in terms of its precise chemical structure, there has been no success in proposing an adequate definition. It should be noted that lignin is not a single definable compound, but rather is a group or system of high molecular weight, amorphous, materials that are chemically closely related. Furthermore, it should be noted that lignin, in its natural form in wood, is primarily of academic interest only. Pure and natural lignin has resisted all efforts at isolation in its completely and unchanged state. That is, no method has yet been devised for isolation of lignin of wood in a form identical with that in which it exists in its natural state. One description of lignin is that it is comprised of polymeric chains having molecular weights over 10,000 with multiple different units. One substantial monomeric unit contained in the lignin polymeric chains is propyl phenol.

According to U.S. Pat. No. 4,548,721, lignins are all characterized by having little or no oil solubility. This reference goes on to state that test results have shown these lignins to be ineffective when used as surfactants in enhanced oil recovery processes. Accordingly, much research has been expended at the modification of such lignins in order to produce oil-soluble derivatives thereof which, when used in conjunction with water-soluble surfactants produce comparable results in efficiency of enhanced oil recovery to that achievable using a conventional surfactant solution of one (1) or more costly petroleum sulfonates.

U.S. Pat. Nos. 4,739,041 and 4,790,382 describe a method of producing surfactants from lignin which comprises subjecting lignin to two reactions, alkylation and oxidation. The lignin surfactants are used in surfactant floods for enhanced oil recovery. However, when preparing surfactant systems with divalent ion brines, these lignin derivatives must be dissolved in fresh water followed by the addition of the other compounds and brine. They will not dissolve in divalent brines alone. They must first be solubilized in fresh water before adding other components. In many cases, this is a draw back since fresh water is not readily available in large quantities in the field.

U.S. Pat. Nos. 4,739,040 and 4,787,454 disclose a method of surfactant flooding with lignin surfactants produced by reducing lignin in the presence of a carbon monoxide or hydrogen reducing agent at high temperature and pressure to produce low molecular weight lignin phenols, and subjecting the lignin phenols to one or a combination of several reactions such as alkoxylation, alkylation, sulfonation, sulfation, alkoxysulfation and sulfomethylation.

U.S. Pat. No. 5,094,295 discloses a method of producing water-soluble surfactants from lignin, which comprises alkylating lignin at phenolic oxygen sites with an alkyl chain having about 3 to about 24 carbon atoms, sulfonating the alkylated lignin, and oxidizing the alkylated, sulfonated lignin sufficiently to break the lignin into smaller polymeric and monomeric compounds having water-soluble surfactant properties. These modified lignin surfactants are used in surfactant floods for enhanced oil recovery.

U.S. Pat. Nos. 4,756,370 and 4,821,803 involve substituting lignosulfonate and amine into a blended surfactant system for a high equivalent weight, oil-soluble petroleum sulfonate. U.S. Pat. No. 4,548,721 involves using the reaction product of a lignin and amine at elevated temperatures as an enhanced oil recovery surfactant. U.S. Pat. Nos. 4,822,501 and 5,114,599 involve substituting amine and a Kraft lignin chemically modified by ozonolysis or sulfonation into a blended surfactant system for a high equivalent weight, oil-soluble sulfonate.

Others have shied away from the use of unmodified Kraft lignin for use in surfactant systems for enhanced oil recovery purposes. Only lignosulfonates or chemically modified Kraft lignins have been considered suitable for use in this type of application. Most pulping mills world-wide use the Kraft pulping process. The ability to use unmodified Kraft lignin in surfactant systems would eliminate the need to construct special facilities to modify Kraft lignins of the world where lignosulfonates are unavailable. Currently, there is a need to eliminate this costly step of modification and improve the economics of surfactant flooding.

SUMMARY OF THE INVENTION

The invention is directed to a method and to compositions useful for the enhanced recovery of oil from a subterranean formation having at least one injection well and at least one production well. A surfactant system comprised of an unmodified Kraft lignin, an oil-soluble amine, and a water-soluble sulfonate combined in water is injected into the producing formation. The surfactant system is then driven through the formation toward the producing well. The oil mobilized by the advancing surfactant system is produced through the production well.

DETAILED DESCRIPTION OF THE INVENTION

Preparation of Stable, Active Ternary Blends

The combination of the unmodified Kraft lignin, water-soluble sulfonate and the oil-soluble organic amine is novel for use in enhanced oil recovery. The amines employed are generally fatty amines which are very insoluble in water and tend to precipitate when water is added. However, under proper conditions, the amines can be dissolved in water which contains a surfactant such as a petroleum sulfonate or alkylaryl sulfonate with the lignin.

One mixing procedure is to combine the amine and the lignin and to add brine which has been preheated to a temperature above the melting point of the amine. In the case of tallow amine, a temperature of about 60° C. to about 70° C. is adequate. The combination of lignin, amine and brine is stirred at about 65 ° C. for about one (1) hour. The water-soluble surfactant is then added directly into the warm, brine solution. After an additional 1 to 5 hours of stirring at about 65° C., the solution is allowed to cool.

Example 1 details the mixing procedure wherein the amine and the water-soluble surfactant are combined. The lignin is then added thereto with the brine being added last. The components are combined at room temperature. The mixture is then stirred and heated, for example, at about 65° C., for about 1 to about 5 hours.

Another mixing procedure, which also gives stable solutions, requires a thorough preblending of an aqueous lignin concentrate and an amine. When the proper ratios of lignin to amine are employed and the proper mixing conditions are used, a thick, stable slurry or paste is produced. Proper mixing involves warming the mixture to a temperature above the melting point of the amine and slowly stirring until the mixture becomes homogeneous. This preblended lignin and amine can then be weighed or metered as though it were a single component. It can be combined with the water-soluble sulfonate and the brine which has not been preheated. The entire formulation is then mixed to obtain the surfactant solution useful in enhanced oil recovery.

In a field operation, the amine is preferably dissolved in a solvent, for example, isopropyl alcohol. The water-soluble sulfonate, the lignin and the amine dissolved in the solvent are each added to the brine, individually using an inline mixer for each component. The order of addition is preferably the water-soluble sulfate first with the lignin following and thereafter the amine dissolved in the solvent.

When the ratio and total concentration of lignin, water-soluble sulfonate and amine are correct, a stable solution results. Generally, too much amine (higher than 20% by volume of the mixture) or too little water-soluble sulfonate (lower than 20% of the mixture) will cause precipitation of the surfactant within 24 hours. The stable solutions usually remain as a single phase indefinitely once they have remained stable for 24 hours. Solution as used herein, is intended to include stable dispersions and emulsions as well as classical solutions. While phase stability is preferred, blends which are phase unstable can be used in enhanced oil recovery systems.

Stability, as discussed here, is dependent on the salinity of the water used. The brine used here is a combination of 20% by volume of a simulated oil-field brine and 80% by volume of a simulated fresh water. The water analyses are shown in Table I. The blend used here has about 7000 ppm total dissolved solids and contains about 190 ppm divalent cations ($Ca^{+2}Mg^{+2}$). At high ratios of brine to fresh water, the observed range of stability decreases and phase unstable solutions result.

TABLE I

WATER ANALYSIS

| | Concentration, ppm | |
|---|---|---|
| | Brine | Fresh Water |
| $Na^+$ | 12,762 | 18 |
| $Ca^{+2}$ | 346 | 74 |
| $Mg^{+2}$ | 211 | 17 |
| $Cl^-$ | 18,798 | 130 |
| $SO_4^{-2}$ | 2,535 | 105 |
| Total Dissolved Solids | 34,652 | 344 |

A wide range of non-ionic or anionic water-soluble surfactants can be used. Among the anionic surfactants useful in the invention are: petroleum sulfonates, alkoxylated alkylsulfonates or sulfates, alkoxylated alkylaryl sulfonates or sulfates, alkyl sulfonates, and alkylaryl sulfonates. These anionic surfactants can be neutralized with a variety of cations including sodium, potassium, ammonium, magnesium, calcium, alkyl amines and alkoxy amines. Other anionic surfactants such as phosphates can also be used. The non-ionic surfactants useful in the invention include polyglycol ethers, alkoxylated alcohols, alkoxylated carboxylic acids, alkoxylated alkyl phenols, alkoxylated amines, arnides and esters of alkoxylates. The preferred surfactants are water-soluble alkylaryl sulfonates, water-soluble petroleum sulfonates, and combinations thereof.

Examples of useful oil-soluble organic amines include alkyl amines and aryl amines having from about 8 to 22 carbon atoms. Amines soluble in common organic solvents such as toluene, benzene, xylene, perchloroethylene, chloroform, butanol and amyl alcohol are suitable. Primary, secondary, tertiary and quaternary amines can be used in the surfactant systems of the present invention. More preferred are primary fatty amines having from 16 to 22 carbon atoms. Lignins which may be used in the present invention are alkali lignins, also known as Kraft lignins or thiolignins, which are obtained by cooking wood chips at high temperature in a caustic solution of sodium sulfide. In the present invention the alkali lignins do not have to be processed to render them water-soluble at neutral pH. These alkali lignins are useful in their unmodified form. Kraft lignins received from pulp mills may have sufficient base contained therein to raise the pH enough to dissolve the Kraft lignin. If not, additional base is added to the surfactant system in order to dissolve the lignin. For purposes of this description and the claims of this invention, the term "lignin" will be used to describe alkali lignins, also known as Kraft lignins or thiolignins. Such lignins are commercially available, for example, Indulin C is a trademarked pine Kraft lignin product sold by Westvaco Corp. It is a spray dried powder comprising 72% by weight lignin and the remainder inorganic salts and hemicellulose. Indulin AT is a trademarked purified Indulin C sold by Westvaco Corp. with a lignin content of 93% by weight.

EXAMPLE 1

In a small mixing bottle were combined 0.15 grams of tallow amine (Adogen 170, Sherex Chemical Company), 0.52 grams of Indulin C, unmodified Kraft lignin, available from Westvaco Corp. and 0.7 grams of a 52% active $C_{12}$-benzene sulfonate (C550 available from Vista Chemical Company, Houston, Tex.; average equivalent weight of 340 gm/equiv.). To this mixture was added 48.65 grams of a mixture of 20% by volume brine and 80% by volume fresh water at room temperature. The bottle was capped and the contents were warmed to and maintained at about 65° C. in a water bath and stirred for approximately 5 hours. The resulting solution contained 0.3% by weight tallow amine, 1.0% by weight Indulin C (as total solids; about 0.7% by weight lignin) and 0.7% by weight alkylaryl sulfonate. The blend was prepared at a level of 2% total active surfactant. After one day, the blend were examined for evidence of phase instability or precipitate formation. Twenty-two (22) stable blends containing up to 0.4% by weight tallow amine were prepared in similar fashion. The lignin content of the stable blends ranged from about 10% to about 60% by weight of the blend compositions.

Other compositions were mixed in a similar manner, with a total concentration remaining at 2% on an active weight/weight basis.

Properties of Blends

Phase stability in brine is only the first test of an enhanced oil recovery surfactant system. Once the ternary blends reported here pass this test, their activity was determined by an interfacial tension test. The interfacial tensions were determined on a spinning drop tensiometer (University of Texas) against an Illinois crude oil. Low tension surfactant systems commonly have equilibrated interfacial tensions in the range of 1 to 100 millidynes/cm, and these so-called ultra-low interfacial tensions are required for good oil recovery performance. Table II shows several examples of formulations of tallow amine, Indulin C and C550, which are potential enhanced oil recovery surfactants. The values reported in Table II are one-hour interfacial tension measurements and the percentages reported therein are percent by weight. For many blends, a one-hour interfacial tension measurement is a sufficient indicator of probable utility as an EOR surfactant system. However, some systems with one-hour interfacial tensions above 100 millidynes/cm may also exhibit good enhanced oil recovery. The interfacial tensions of these systems are found to decrease as the system is allowed to equilibrate. Substantially all, if not all, systems useful in enhanced oil recovery have equilibrated interfacial tensions below 100 millidynes/cm, preferably below 50 millidynes/cm.

In practice, the interfacial tension measurements against the crude oil of interest will decline with respect to time until the crude oil/surfactant system combination is equilibrated, at which time the interfacial tension should remain constant over time within experimental error. For example, the instructions for the University of Texas Spinning Drop Interfacial Tensiometer suggest that the system can be considered equilibrated when three consecutive hourly drop width readings agree to within about 0.001 cm.

TABLE II

THE EFFECT OF SURFACTANT COMPOSITION ON INTERFACIAL TENSION

| Amine | | Indulin C | | Sulfonate | | 20% Brine | IFT |
|---|---|---|---|---|---|---|---|
| Wt. (gm) | % | Wt. (gm) | % | Wt. (gm) | % | Wt. (gm) | (Millidynes/cm) |
| 0.05 | 0.1 | 0.58 | 1.1 | 0.77 | 0.8 | 48.60 | 596 |
| 0.05 | 0.1 | 0.47 | 0.9 | 0.96 | 1.0 | 48.52 | 677 |
| 0.05 | 0.1 | 0.37 | 0.7 | 1.15 | 1.2 | 48.43 | 778 |
| 0.05 | 0.1 | 0.26 | 0.5 | 1.35 | 1.4 | 48.34 | 732 |
| 0.05 | 0.1 | 0.16 | 0.3 | 1.54 | 1.6 | 48.25 | 711 |
| 0.10 | 0.2 | 0.63 | 1.2 | 0.58 | 0.6 | 48.69 | 1203 |
| 0.10 | 0.2 | 0.53 | 1.0 | 0.77 | 0.8 | 48.61 | 842 |
| 0.10 | 0.2 | 0.42 | 0.8 | 0.96 | 1.0 | 48.52 | 593 |
| 0.10 | 0.2 | 0.32 | 0.6 | 1.15 | 1.2 | 48.43 | 640 |
| 0.10 | 0.2 | 0.21 | 0.4 | 1.35 | 1.4 | 48.34 | 737 |
| 0.10 | 0.2 | 0.11 | 0.2 | 1.54 | 1.6 | 48.27 | 719 |
| 0.15 | 0.3 | 0.63 | 1.2 | 0.48 | 0.5 | 48.74 | 199 |
| 0.15 | 0.3 | 0.58 | 1.1 | 0.58 | 0.6 | 48.69 | 13 |
| 0.15 | 0.3 | 0.53 | 1.0 | 0.67 | 0.7 | 48.65 | 21 |
| 0.15 | 0.3 | 0.47 | 0.9 | 0.77 | 0.8 | 48.61 | 2352 |
| 0.15 | 0.3 | 0.42 | 0.8 | 0.87 | 0.9 | 48.56 | 25 |
| 0.15 | 0.3 | 0.37 | 0.7 | 0.96 | 1.0 | 48.52 | 1621 |
| 0.15 | 0.3 | 0.32 | 0.6 | 1.06 | 1.1 | 49.43 | 1322 |
| 0.15 | 0.3 | 0.21 | 0.4 | 1.25 | 1.3 | 49.51 | 932 |
| 0.15 | 0.3 | 0.11 | 0.2 | 1.44 | 1.5 | 48.30 | 565 |
| 0.20 | 0.4 | 0.42 | 0.8 | 0.77 | 0.8 | 48.61 | 1470 |
| 0.20 | 0.4 | 0.31 | 0.6 | 0.96 | 1.0 | 48.52 | 191 |

The entries in Table II are merely examples of a larger set of ultralow interfacial tensions and are not meant to cover the entire set.

Use of Ternary Blends for Enhanced Oil Recovery

In addition to showing brine stability and the ability to lower interfacial tensions, the surfactant blends described above demonstrate excellent oil recovery ability in laboratory core floods.

A typical enhanced oil recovery operation utilizing the ternary blends would consist of injection of a surfactant system into the oil producing formation through injection wells. The system for a low tension chemical flood normally ranges from about 1% to about 8% by weight total surfactant and preferably from about 2% to about 6%. The components of the ternary surfactant blend can be present in varying amounts. The preferred compositions include the amine in an amount of about 1% to about 20%, the lignin in an amount up to about 70% and the water-soluble sulfonate in an amount of about 30% to about 99%, wherein the percentages are by weight. Economic consideration suggests maximizing the amount of lignin. Therefore, at least 5% lignin is preferred and 10% is most preferred. Stable systems exhibiting ultra low IFTs and demonstrating enhanced oil recovery have been formulated with as much as about 50% by weight Indulin C (about 35% by weight lignin). The exact concentration and ratio of the surfactant components which are useful depend on several factors including the particular brine and crude oil and the reservoir temperature. Blends for a particular reservoir will be optimized based on the conditions existing in that reservoir. Likewise, the choice of individual components will depend on the particular conditions and can be optimized utilizing well known techniques such as interfacial tension measurements and the core flood tests described below.

In the case of a phase partitioning surfactant system, the concentration of surfactant blend will generally be higher, in the range of about 6 to about 8% by weight. The ratio of the components in the ternary surfactant blend will be in the same range as that for the low tension floods. Generally, phase partitioning surfactant systems include a co-solvent such as an alcohol, amide, ester, ether, aldehyde, ketone, alkoxylated alcohol, sulfated or sulfonated alcohol and sulfated or sulfonated alkoxylated alcohol. Such co-solvents are usually alkynols having 4 to 6 carbon atoms.

The volume of surfactant system slug injected is generally about 0.01 to about 1.0 pore volumes. Again, the exact volume injected will be determined on a case by case determination based upon reservoir conditions and concentration of the surfactant solution. Generally, the surfactant slug is followed by a solution of a mobility control agent such as a polysaccharide or a partially hydrolyzed polyacrylamide. The polymer solution drives the surfactant slug evenly through the formation. The oil mobilized by the surfactant slug is swept into the production wells where it is recovered.

The utility of these ternary blends in tertiary oil recovery was shown by a series of core floods. In each of these floods, a Berea Sandstone core (2"×2"×12") was evacuated and saturated with Brine. The brine composition was given in Table I.

The core was then saturated at a rate of 10 ft/day with an Illinois crude oil having a viscosity of 3.6 centipoise and a density of 0.82 g/ml. The initial oil saturations average 65.4%. The core was waterflooded at a rate of 5 ft/day with the same brine to a waterflood residual oil saturation averaging 34.8%.

EXAMPLE 2

A chemical flood was performed using a blend containing 0.3% amine/1.0% Kraft lignin/0.7% C550 (IFT=21 millidynes/cm.). The chemical flood was performed by injecting a 0.25 pore volume (PV) slug of 2% active surfactant in about 7000 ppm TDS brine (20% by volume brine from Table I plus 80% by volume fresh water from Table I) followed by continuous injection of a 0.15% solution of a partially hydrolyzed polyacrylamide polymer (Alcoflood 1175L available from Allied Colloids) in fresh water (343 ppm total dissolved solids). The surfactant and polymer solutions were injected at a rate of 1 ft/day. Tertiary recovery was about 87.8%, with a final saturation of about 4.2%.

To verify this result, the surfactant was reformulated to 5% active and a 0.1 pore volume slug was injected into a waterflooded core as outlined above. The total amount of surfactant injected (slug size×concentration) in these two cases was the same. The recovery in the second flood was about 88.7%, with a final saturation of about 3.9%.

The foregoing data demonstrates a relationship between low interfacial tensions and good tertiary recovery.

The foregoing description has been directed to particular embodiments of the invention for the purposes of illustration and explanation. Those skilled in the art will readily appreciate modifications and changes in the compositions and procedures set forth without departing from the scope and spirit of the invention. Applicant's intent is that the following claims be interpreted to embrace all such embodiments and variations.

What is claimed is:

1. A method for the enhanced recovery of oil from a subterranean formation containing oil and having at least one production well and at least one injection well, the method comprising:
    injecting into the formation a surfactant system having at least
        a surfactant blend having at least
            an unmodified Kraft lignin,
            an oil-soluble primary alkyl amine having from about 8 to about 22 carbon atoms, and
            a water-soluble anionic surfactant selected from the group consisting of petroleum sulfonates, alkylaryl sulfonates and combinations thereof,
            wherein the blend has from about 1% to about 20% by weight of the oil-soluble amine, from about 5% to about 70% by weight of the lignin, and from about 10% to about 99% by weight of the water-soluble anionic surfactant; and
        water, wherein the equilibrated interfacial tension between the oil and the surfactant system is less than about 100 millidynes/cm and the surfactant system has a pH of at least 9;
    driving the surfactant system through the formation; and
    producing the oil mobilized by the surfactant system through the production well.

2. The method according to claim 1, wherein the equilibrated interfacial tension between the oil and the surfactant system is less than about 50 millidynes/cm.

3. The method according to claim 1, wherein the blend is present in the surfactant system at a concentration ranging from about 1% to about 8% by weight.

4. The method according to claim 1, wherein the water-soluble surfactant is present in an amount from about 30% to about 99% by weight.

5. The method according to claim 4, wherein the lignin is present in an amount from about 10% to about 70% by weight.

6. The method according to claim 5, wherein the amine is a primary fatty amine having from about 16 to about 22 carbon atoms.

7. The method according to claim 6, wherein the anionic surfactant is an alkylaryl sulfonate.

8. A surfactant composition useful for preparing a surfactant system by combining the surfactant composition and water, wherein the surfactant system is useful for the enhanced recovery of oil from a subterranean formation containing oil, the surfactant composition comprising:
    an oil-soluble primary alkyl amine having from about 8 to about 22 carbon atoms;
    an unmodified Kraft lignin; and
    a water-soluble anionic surfactant selected from the group consisting of petroleum sulfonates, alkylaryl sulfonates and combinations thereof,
    wherein the oil-soluble amine is present in an amount from about 1% to about 20% by weight, the lignin is present in an amount of from about 5% to about 70% by weight, and the anionic surfactant is present in an amount of from about 30% to about 99% by weight, each based on the total surfactant present, and wherein when the surfactant composition is added to water to form the surfactant system, the equilibrated interfacial tension between the oil and the surfactant system is less than about 100 millidynes/cm and the surfactant system has a pH of at least 9.

9. The composition according to claim 8, wherein the equilibrated interfacial tension between the oil and the surfactant system is less than about 50 millidynes/cm.

10. The composition according to claim 8, wherein the amine is a primary fatty amine having from about 16 to about 22 carbon atoms.

11. A composition according to claim 10, wherein the anionic surfactant is an alkylaryl sulfonate.

12. A surfactant composition useful for preparing a surfactant system by combining the surfactant composition and water, wherein the surfactant system is useful for the enhanced recovery of oil from a subterranean formation containing oil, the surfactant composition comprising:

a primary fatty amine having from about 16 to about 22 carbon atoms;

an unmodified Kraft lignin; and a water-soluble anionic surfactant selected from the group consisting of petroleum sulfonates, alkylaryl sulfonates and combinations thereof, wherein the amine is present in an amount from about 1% to about 20% by weight, the lignin is present in an amount of from about 10% to about 70% by weight, and the anionic surfactant is present in an amount of from about 30% to about 99% by weight, each based on the total surfactant present, and wherein when the surfactant composition is added to water to form the surfactant system, the equilibrated interfacial tension between the surfactant system and the oil is less than about 100 millidynes/cm and the surfactant system has a pH of at least 9.

13. A composition according to claim 12, wherein the anionic surfactant is an alkylaryl sulfonate.

14. A method for the enhanced recovery of oil from a subterranean formation containing oil and having at least one production well and at least one injection well, the method comprising:

injecting into the formation a surfactant system having at least
a surfactant blend having at least
a primary fatty amine having from about 16 to about 22 carbon atoms,
an unmodified Kraft lignin, and
a water-soluble alkylaryl sulfonate,
wherein the surfactant blend is about 1% to about 8% by weight of the surfactant system, and
wherein the blend has from about 1% to about 20% by weight of the primary fatty amine, from about 5% to about 70% by weight of the lignin and from about 30% to about 99% by weight of the water-soluble alkylaryl sulfonate, and
water, wherein the equilibrated interfacial tension between the oil and the surfactant system is less than about 100 millidynes/cm;

driving the surfactant system through the formation; and
producing the oil mobilized by the surfactant system through the production well.

15. The method according to claim 14, wherein the lignin is present in an amount from about 10% to about 70% by weight.

16. The method according to claim 15, wherein the pH of the surfactant system is at least 9.

17. A surfactant system useful for the enhanced recovery of oil from a subterranean formation containing oil, the surfactant system comprising:

an oil-soluble primary alkyl amine having from about 8 to about 22 carbon atoms;

an unmodified Kraft lignin;

a water-soluble anionic surfactant selected from the group consisting of petroleum sulfonates, alkylaryl sulfonates and combinations thereof; and water, wherein the oil-soluble amine is present in an amount from about 1% to about 20% by weight, the lignin is present in an amount of from about 5% to about 70% by weight, and the anionic surfactant is present in an amount of from about 30% to about 99% by weight, each based on the total of these three components present, and wherein the equilibrated interfacial tension between the oil and the surfactant system is less than about 100 millidynes/cm and the surfactant system has a pH of at least 9.

18. The surfactant system according to claim 17, wherein the equilibrated interfacial tension between the oil and the surfactant system is less than about 50 millidynes/cm.

19. The surfactant system according to claim 17, wherein the amine is a primary fatty amine having from about 16 to about 22 carbon atoms.

20. The surfactant system according to claim 17, wherein the anionic surfactant is an alkylaryl sulfonate.

21. A surfactant system useful for the enhanced recovery of oil from a subterranean formation containing oil, the surfactant system comprising:

a primary fatty amine having from about 16 to about 22 carbon atoms;

an unmodified Kraft lignin;

a water-soluble anionic surfactant selected from the group consisting of petroleum sulfonates, alkylaryl sulfonates and combinations thereof; and water, wherein the amine is present in an amount from about 1% to about 20% by weight, the lignin is present in an amount of from about 10% to about 70% by weight, and the anionic surfactant is present in an amount of from about 30% to about 99% by weight, each based on the total of these three components present, and wherein the equilibrated interfacial tension between the surfactant system and the oil is less than about 100 millidynes/cm and the surfactant system has a pH of at least 9.

22. The surfactant composition according to claim 21, wherein the anionic surfactant is an alkylaryl sulfonate.

* * * * *